United States Patent [19]

Lehmann

[11] 4,393,406
[45] Jul. 12, 1983

[54] CIRCUIT FOR MODIFYING THE GRADATION OF PICTURES PRODUCED BY VIDEO SIGNALS

[75] Inventor: Klaus Lehmann, Mühltal, Fed. Rep. of Germany

[73] Assignee: Robert Bosch GmbH, Stuttgart, Fed. Rep. of Germany

[21] Appl. No.: 254,447

[22] Filed: Apr. 15, 1981

[30] Foreign Application Priority Data

Apr. 26, 1980 [DE] Fed. Rep. of Germany ....... 3016242

[51] Int. Cl.$^3$ .............................................. H04N 5/14
[52] U.S. Cl. ..................................... 358/160; 358/173
[58] Field of Search ................. 358/34, 160, 171, 172, 358/173

[56] References Cited

U.S. PATENT DOCUMENTS 4,143,398  3/1979  Harwood et al. ...................... 358/34

FOREIGN PATENT DOCUMENTS 2428489  6/1974  Fed. Rep. of Germany .

*Primary Examiner*—Richard Murray
*Attorney, Agent, or Firm*—Frishauf, Holtz, Goodman & Woodward

[57] ABSTRACT

A diode, of which the nonlinear characteristic is utilized for correcting the gradation characteristic of a video signal, has one of its electrodes connected to the output of the correction circuit, and has a voltage applied to its other electrode which is derived from the output voltage by inversion, amplification and integration during the blanking interval. Thus, in every blanking interval, the steady potential terminal of the diode is clamped to the desired black picture level for automatically holding constant the working region of the diode. An operational transconductance amplifier charges a capacitor, the voltage of which is applied to the diode through an impedance converter.

3 Claims, 1 Drawing Figure

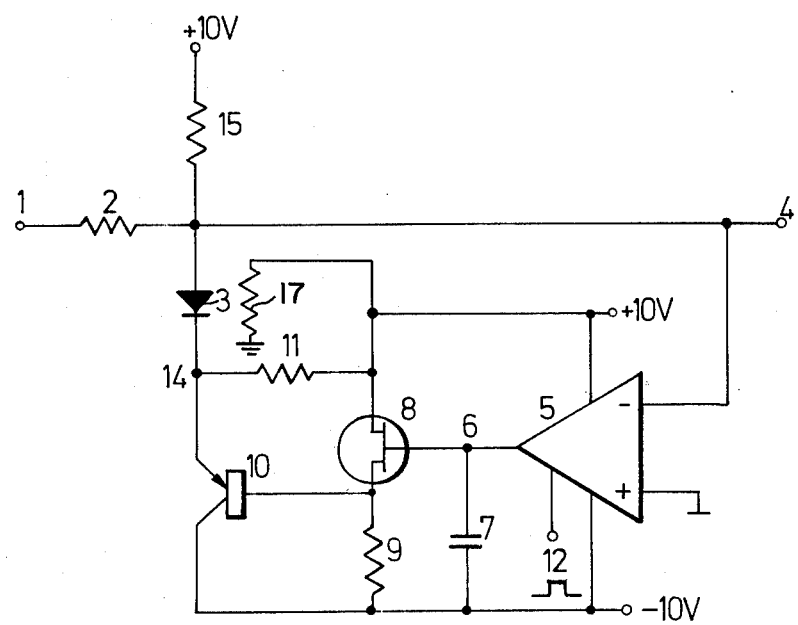

CIRCUIT FOR MODIFYING THE GRADATION OF PICTURES PRODUCED BY VIDEO SIGNALS

This invention relates to a nonlinear transmission circuit using a diode for correcting or modifying the gradation of a picture subsequently produced with video signals processed by the circuit.

It is often necessary to fit the gradation characteristic of a camera transducer, for example, a television camera tube to the gradation characteristic of a picture reproducing system. A gradation corrector circuit is commonly used in the video amplifier of the picture pick-up or camera system. In such circuits the nonlinear characteristic of one or more semi-conductor diodes is conventionally utilized. In such arrangements, the signal is supplied, for example, in the form of a current to a diode and an output signal is taken off as the voltage drop across the diode and supplied to following circuits. The diode in these cases has one electrode to which the signal is supplied and from which the voltage is taken as the output signal and the potential of the other electrode, in the known circuit (DE-AS No. 24 28 489) is controlled in accordance with the temperature by means of a semi-conductor component, in order to compensate for the temperature dependence of the diode characteristic.

This compensation does not, however, work out satisfactorily, for the reason, among others, that the currents dependent upon the signal through the diode and through the temperature compensation semi-conductor element flow in opposite directions, with the result that during the blanking interval, or at the black value of the video signal, there is an insufficient compensation.

THE INVENTION

It is an object of the invention to provide a circuit in which this compensation can be improved compared to that produced in the known circuits.

Briefly, while a first terminal of the diode is connected to the output of the circuit, the second terminal of the diode has applied to it a voltage derived from the voltage on the first terminal by inversion, amplification and integration during the blanking intervals of the video signals, in such a manner as to bring the output signal to reference ground potential. This has the advantage that the temperature dependence of the diode characteristic is compensated, particularly, for the black level of the video signal, very precisely. Furthermore, the simplicity of the circuit and the absence of compensated elements are to be regarded as further advatages of the invention. Thus, an amplifier periodically switched on during the blanking interval by an enabling input may have its inverting input connected to the first terminal of the diode and at its output provide a current output supplied to a capacitor and to an impedance converter. The impedance converter has its input connected to the capacitor and its output connected to the second terminal of the diode.

The amplifier is preferably of the type known as an operational trans-conductance amplifier. For temperature stabilization of the white level of the video signals, the diode may be provided with a thermostatic heater.

THE DRAWING

The invention is further described by way of illustrative example with reference to the annexed drawing, the single FIGURE of which is a circuit diagram of an embodiment of the invention.

DESCRIPTION OF THE ILLUSTRATED EMBODIMENTS

Video signals having, for example, a peak amplitude of three volts, are supplied to the terminal 1. They proceed through the resistance 2 to the output 4 of the circuit. Connected to this output 4 is one electrode of the diode 3. The circuit point 14 to which the other electrode of the diode is connected has, as described below, a potential independent of the video signal. The black level of the video signal at the input 1 is zero volts and the signals are positive going toward the white level, so that they control the diode 3 in its direction of conduction. In order that the diode 3 may still be conducting at the black level of the signals, a resistance 15 is provided leading from the diode 3 and the output 4 to a positive operating voltage of, for example, +10 V.

Since the resistance is large in comparison with the forward resistance of the diode 3, there is produced in the diode 3 a current proportional to the video signal, which in turn produces a voltage drop across the diode 3 having the desired characteristic. For an input amplitude of the video signals of 3 V and a value of 1k ohms of the resistor 2, the video signals at the output 4 have an amplitude of about 0.25 V.

The output 4 is connected to the inverting input of an amplifier 5, of which the noninverting input is grounded to the apparatus chassis. The amplifier is also connected to operating voltages of +10 V and −10 V. The amplifier 5 is switchable, with the terminal 12 being provided for connection of pulses for switching it on and off, and it provides a current output such as that of amplifiers which are commonly designated as operational transconductance amplifiers (ODA) and provide at the output a current which, on the one hand, is proportional to the difference between the voltages and, on the other hand, flows only when a turn-on voltage is provided at its enabling input 12.

In the illustrated example, a pulse of the horizontal sweep frequency is periodically applied to the enabling input 12, so that only during the flyback of the horizontal sweep is a current provided by the output of the amplifier 5. This current charges or discharges, according to polarity, the capacitor 7. The voltage produced at the capacitor 7 is then supplied to an impedance converter consisting of the transistors 8 and 10, as well as the resistances 9 and 11, for supplying an output to the circuit point 14. Any DC voltage shift arising through the impedance converter is noticable merely as an additional constant charge of the capacitor 7 and does not create any disturbance in the essential relationships.

For the duration of the horizontal scan frequency pulse, the amplifier 5 supplies a current that brings along a change of the charge of the capacitor 7 until a change of the voltage at the circuit point 4 allows the voltage at the output 4 of the circuit to become zero. During the following active line period, the output of the amplifier 5 is blocked, so that no more change of the voltage at the circuit point 4 can take place. For that purpose, it is necessary that the time constant of the combination of the capacitors 7 and the sum of the input resistance of the impedance converter and the output resistance of the amplifier should be made sufficiently large. Since the two resistances are normally quite large, it is sufficient for a practical embodiment of the circuit to utilize a capacitor 7 having a capacitance of 10 nF.

Since the regulation provided by the circuit just described, setting the black level energy time at zero volts, provides compensation for the temperature of the diode characteristic primarily at the black level, it can be useful to stabilize the white level by reducing the temperature fluctuations of the diode 3 by means of a thermostat. Such thermostats are readily provided in the form of resistances with positive temperature coefficients, for example, the resistance 17 heated by the operating voltage of the circuit and in thermally conductive relation with the insulated casing of the diode 3. If the temperature variations to which the diode 3 is exposed are small enough for their effects to be negligible, the resistance 17 may be omitted.

I claim:

1. A circuit for modifying the gradation of pictures produced with video signals, comprising:

a first resistance (2) interposed between a source (1) of said video signals and an output terminal (4) for supplying video signals to picture producing apparatus;

an inverting keyable amplifier (5) having its input connected to said output terminal (4) and its keying input (12) connected so as to enable said amplifier only during blanking intervals of said video signals, said amplifier having a connection to a fixed reference potential and being constituted so as to provide a current at its output (6) of a polarity dependent on whether said potential of said output terminal (4) exceeds or is less than said reference potential;

a capacitor (7) connected to said output (6) of said amplifier (5) for charging or discharging by output current of said amplifier (5) and for storing charge while said amplifier is disabled, a diode (3) and an impedance converter (8,9,10,11) connected between said output terminal (4) and said output (6) of said amplifier in such a way that said diode is interposed between said output terminal (4) and said impedance converter and is poled so as to be conductive while the portion of said video signal between blanking intervals is provided by said video signal source (1), said impedance converter serving to cause the charging or discharging of said capacitor (7) to continue during video blanking intervals until the potential of said output terminal is substantially the same as said reference potential, and means (15) for assuring that said diode remains conducting even when said output terminal is at said reference potential, whereby substantially a voltage fraction of said video signals is made available at said output terminal (4) which fraction is determined by the ratio of the forward resistance of said diode to the sum of said diode forward resistance and said first resistance, while the temperature dependence of said diode forward resistance is compensated, at least for the black level of said video signal, during each blanking interval.

2. A circuit as defined in claim 1 in which said amplifier is an operational transconductance amplifier.

3. A circuit as defined in claim 1 or 2 in which thermostatic heating means (17) are provided for stabilizing the temperature of said diode (3) for mitigating temperature-dependent variation of the white level of said video signals at said output (4) of said circuit.

* * * * *